(12) United States Patent
Tremblay et al.

(10) Patent No.: US 8,598,805 B2
(45) Date of Patent: Dec. 3, 2013

(54) LIGHT EMITTING DIODE BULB

(75) Inventors: Eric Tremblay, Québec (CA); Grégoire Lussier, Granby (CA); Tommy Dallaire, Québec (CA); Sébastien Grenier, Québec (CA)

(73) Assignee: RV Lighting, Quebec (CA)

( * ) Notice: Subject to any disclaimer, the term of this patent is extended or adjusted under 35 U.S.C. 154(b) by 193 days.

(21) Appl. No.: 13/112,088

(22) Filed: May 20, 2011

(65) Prior Publication Data

US 2011/0285289 A1 Nov. 24, 2011

Related U.S. Application Data

(60) Provisional application No. 61/346,707, filed on May 20, 2010.

(30) Foreign Application Priority Data

May 19, 2011 (CA) .................................... 2740631

(51) Int. Cl.
H05B 37/02 (2006.01)

(52) U.S. Cl.
USPC ............ 315/291; 315/297; 315/302; 315/308

(58) Field of Classification Search
USPC .................. 315/291, 294, 297, 302, 307–308
See application file for complete search history.

(56) References Cited

U.S. PATENT DOCUMENTS

| 5,459,478 | A | 10/1995 | Bolger et al. | |
| 6,786,625 | B2 | 9/2004 | Wesson | |
| 7,038,399 | B2 * | 5/2006 | Lys et al. | 315/291 |
| 7,268,679 | B2 | 9/2007 | Garcia Briz | |
| 7,296,913 | B2 | 11/2007 | Catalano et al. | |
| 7,597,456 | B2 | 10/2009 | Catalano et al. | |
| 7,888,888 | B2 * | 2/2011 | Huang et al. | 315/307 |
| 8,289,305 | B2 * | 10/2012 | Kang et al. | 345/211 |
| 2002/0047576 | A1 | 4/2002 | Gurthrie et al. | |

(Continued)

FOREIGN PATENT DOCUMENTS

| EP | 0 660 648 | 6/1995 |
| GB | 2435724 | 9/2007 |
| WO | WO 03/049505 | 6/2003 |
| WO | WO 2009/136328 | 11/2009 |

OTHER PUBLICATIONS

Offer of sale from the website www.sailorsams.com downloaded on Feb. 9, 2010.

(Continued)

Primary Examiner — Jason M Crawford
(74) Attorney, Agent, or Firm — Potomac Patent Group, PLLC

(57) ABSTRACT

A LED bulb comprising a support having at least one LED mounted on a first side, the at least one LED being electrically coupled to a circuit mounted on a second side of the support for driving the LED bulb at a first or a second light intensity level, the circuit comprising input terminals connectable to a power supply for receiving an input voltage; a LED driver component for adjusting the input voltage supplied to the at least one LED; a comparator circuit for detecting the input voltage and if above a threshold voltage closing a switch to drive the LED bulb at the first light intensity level.

19 Claims, 4 Drawing Sheets

(56) References Cited

U.S. PATENT DOCUMENTS

2007/0132678 A1    6/2007  Wei et al.
2007/0262724 A1*  11/2007  Mednik et al. ................ 315/125
2008/0024070 A1    1/2008  Catalano et al.
2009/0015174 A1*   1/2009  Huang et al. .................. 315/250
2009/0033243 A1*   2/2009  Gater ............................ 315/291
2009/0066264 A1*   3/2009  Huang et al. .................. 315/294
2009/0157567 A1    6/2009  Sayers et al.
2009/0160369 A1*   6/2009  Godbole et al. ............. 315/307
2009/0195180 A1    8/2009  Chenetz
2009/0206776 A1*   8/2009  Inaba ........................... 315/307
2010/0013409 A1*   1/2010  Quek et al. ................... 315/294

OTHER PUBLICATIONS

Offer of sale from the website www.tradekey.com downloaded on Feb. 9, 2010.
Offer of sale from the website www.ledlightsdirect.com downloaded on Feb. 9, 2010.
Offer of sale from the website www.heroledstore.com downloaded on Feb. 9, 2010.
Offer of sale from the website www.ledshoponline.com downloaded on Feb. 9, 2010.

* cited by examiner

LIGHT EMITTING DIODE BULB

PRIORITY STATEMENT UNDER 35 U.S.C §.119 (E) & 37 C.F.R. §1.78

This non-provisional patent application claims priority based upon the prior U.S. provisional patent applications entitled "LIGHT EMITTING DIODE BULB", application No. 61/346,707, filed May 20, 2010, in the names of Eric TREMBLAY, Gregoire LUSSIER, Tommy DALLAIRE and Sebastien GRENIER.

TECHNICAL FIELD

The invention relates generally to a Light Emitting Diode (LED) bulb, specifically although not exclusively to a LED bulb whose emitted light intensity can be varied.

BACKGROUND

The use of LED bulbs to replace incandescent bulbs in 12V applications is gaining popularity in a large number of applications such as head lights in automobiles and other motor vehicles, as well as for indoor lighting within the home, work place, boats and recreational vehicles. Incandescent bulbs, including most halogen bulbs, consume a large amount of power, generate a large amount of heat and have a relatively short life. They provide only a warm white illumination. Conversely, LED bulbs consume less power, generate less heat and have a longer operating life, although they tend to be more expensive than incandescent bulbs.

For many applications, it is desirable to be able to vary the emitted light intensity of a LED bulb, for example between full brightness (bright) and a less bright (dim) intensity. One way of doing this is by decreasing the forward current using variable resistors, voltage regulators, or LED drivers, for example.

However, LEDs have a minimum voltage threshold at which the LED illuminates. They also have a range of safe current operation, above which they will overheat and burn. These thresholds can vary between individual LEDs due to manufacturing differences. These differences are not usually visible at the recommended forward driving current but at lower currents some of the LEDs can stop illuminating entirely. Also, due to slight colour differences between LEDs and the LED emitted light intensity not being linear with current, the colour spectrum can shift at currents below full rating, which can result in some LEDs appearing a different colour. These unpredictable and non-uniform lighting effects are undesirable and particularly inappropriate for some applications such as vehicle head lights where a uniform appearance is required for safety. Also, as the emitted light intensity is not linear with current, the dimming effects are unpredictable and uncontrollable.

For LED light bulbs that use a resistor, such as a shunt resistor, to regulate the operating current in LED strings, the relationship between the emitted light intensity and current is more linear than with LED bulbs including drivers and regulators. However, these bulbs are designed to operate at a fixed voltage, typically 12V. When the operating voltage varies or is not stable, which is often the case in automotive applications, the emitted light intensity varies accordingly. Also, these bulbs still have a minimum voltage threshold below which they cannot light up (which is under 8V for 3 LEDs connected in series) and they burn-out when the input voltage is higher than the one for which it is designed. Therefore, these are not suitable for use in automotive applications such as in Recreational Vehicles where the voltage typically ranges from 6V to 16V (with 12V as typical voltage).

Another approach to varying the emitted light intensity of LED bulbs is pulse width modulation (PWM) which involves turning the LEDs on and off at a high frequency so that the human eye cannot see the strobing effect. The longer the 'on' period relative to the 'off' period of the LED, the brighter the LED will appear. However, the LED circuits are complex and require a timer or an oscillator to control the on/off, which adds to the expense. Also, switching speeds need to exceed the response time of the human eye. Therefore, the power supply driving the LED must also operate at high frequencies. Finally, this kind of device tends to generate audible noises.

Therefore, there is a need for an improved LED bulb which overcomes or reduces at least some of the above described problems.

SUMMARY

The embodiments of the present invention reduce the difficulties and disadvantages of the aforesaid designs and treatments.

From a first aspect, the present invention resides in a LED bulb comprising: a support having at least one LED mounted on a first side, the at least one LED being electrically coupled to a circuit mounted on a second side of the support for driving the LED bulb at a first or a second light intensity level, the circuit comprising: input terminals connectable to a power supply for receiving an input voltage; a LED driver component for adjusting (e.g. boosting or reducing) the input voltage supplied to the at least one LED; a comparator circuit for detecting the input voltage and if above a threshold voltage closing a switch to drive the LED bulb at the first light intensity level.

When the input voltage is below the threshold voltage, but above a minimum required to light the at least one LED (minimum working voltage of the circuit), the switch may be completely or partially open and the LED bulb may thus be driven at the second light intensity level.

The present invention may present the advantage of, as the at least one LED and the circuit are mounted to either side of a support, providing the LED bulb as a single piece (one-piece) device. An exemplary additional advantage is that the support may be a printed circuit board. In this example, the LED bulb can be retrofitted into existing light bulb sockets without the need for adapters or additional hardware. The emitted light intensity of the LED bulb may thus be controlled by existing light control switches such as three-position switches or variable dimming switches.

The LED bulb of the present invention may be operated on at least two emitted light intensity levels, which can be a full emitted brightness or a less intense emitted brightness level. In other words, the first light intensity may be a bright intensity level and the second light intensity may be a dim intensity level. The LED bulb may achieve a reproducible and a consistent brightness at each level, making the LED bulb appropriate for a large number of applications. It may also be possible for the LED bulb of the present invention to operate at further light intensity levels, for example between the bright and the dim intensity levels by use of an appropriate light control switch. For example, if a three position switch is used, the LED bulb may operate at a full brightness, a dim and an off mode. However, if a variable dimmer switch is used, the LED bulb may also operate at brightness levels between the full brightness and the dim level.

An optional preferred example connects the switch to a resistor, which is activated when the switch is closed. The switch may be a MOSFET.

In one exemplary application, such as in Recreational Vehicles, the input voltage is between 5V and 16V. The input voltage can be an AC or a DC supply.

The input terminals may be of any suitable size or shape to fit into existing sockets. In one exemplary embodiment, the input terminals are a pair of pins. Other examples include a wedge, screw or a bayonet type terminal or connector.

The present invention may present the exemplary advantage of the LED bulb being sized and shaped to fit into a socket suitable for receiving a G4-type bulb. This means that the exemplary dimmable LED bulb of the present invention may be retrofitted into sockets for G4 bulbs without the need for adaptation or additional hardware.

The LED bulb may further comprise at least one diode for making the light bulb non-polarized or for converting an AC input voltage to a DC voltage, and at least one capacitor for filtering the input voltage.

An optional preferred example provides the at least one LED in an array of LEDs. In one exemplary embodiment, the array of LEDs comprises two parallel rows of six LEDs, the six LEDs being connected in a series. However, the LED array may comprise a different arrangement or a different number of LEDs.

In one exemplary embodiment, the comparator circuit includes a Zener diode connected in series with a resistor and the switch. In this exemplary embodiment, the threshold voltage is a function of the voltage of the Zener diode and is the voltage required to close the switch. In this exemplary embodiment, the threshold voltage is about 9.5V to close the switch for the first light intensity level, using a Zener diode with a working voltage of about 5.1V. In this exemplary embodiment, the second light intensity level, which is dim, is operational between the working minimum voltage of the circuit and about 9.5V.

In another exemplary embodiment, the comparator circuit includes a comparator integrated circuit, and at least one reference resistor to create a reference voltage, wherein the comparator integrated circuit compares the input voltage to the reference voltage and closes the switch when the input voltage is above the threshold voltage. In this exemplary embodiment, the switch is a MOSFET and the threshold voltage for the first light intensity level is about 8.75V. The comparator integrated circuit may be powered by a Zener diode and a resistor, by a voltage regulator or directly on the input voltage.

The present invention may thus be directed to a LED bulb comprising a support, a LED driver component and a comparator circuit. The support has at least one LED mounted on a first side electrically coupled to a circuit mounted on a second side of the support for driving the LED bulb at a first or a second light intensity level. The circuit comprises input terminals connectable to a power supply for receiving an input voltage. The LED driver component is for adjusting the input voltage supplied to the at least one LED. The comparator circuit is for detecting the input voltage and, if above a threshold voltage, is for closing a switch to drive the LED bulb at the first light intensity level.

Optionally, the switch may be a MOSFET connected to a resistor, which is activated when the switch is closed. The first light intensity may be a bright intensity level and the second light intensity may be a dim intensity level. The input voltage may be between 5V and 16V. The input terminals may be a pair of pins. The support may be a printed circuit board.

The LED bulb may also optionally comprise at least one diode for making the light bulb non-polarized. The LED bulb may further comprise at least one capacitor for filtering the input voltage. The LED bulb may optionally be sized and shaped to fit into a socket suitable for receiving a G4-type bulb. The at least one LED may optionally be an array of LEDs, e.g., two parallel rows of six LEDs, the six LEDs being connected in a series.

The comparator circuit includes a Zener diode connected in series with a resistor and the switch, in which case the switch may be a MOSFET. The threshold voltage for the first light intensity level may optionally be about 9.5V. The switch may optionally remain open and drive the LED bulb at the second light intensity level if the input voltage is below a second threshold voltage of about 8.5V. The MOSFET may further optionally function as a variable resistor and drive the LED bulb at a third light intensity level if the input voltage is between the second threshold voltage and the threshold voltage. The third light intensity level may further optionally vary linearly between the second light intensity level and the first light intensity level in relation to the input voltage compared to the threshold voltage and the second threshold voltage.

The comparator circuit may also optionally include a comparator integrated circuit and at least one reference resistor to create a reference voltage. The comparator integrated circuit may thus optionally compare the input voltage to the reference voltage and close the switch when the input voltage is above the threshold voltage. The threshold voltage for the first light intensity level may thus be about 8.75V.

BRIEF DESCRIPTION OF THE DRAWINGS

Further aspects and advantages of the present invention will become better understood with reference to the description in association with the following in which.

DETAILED DESCRIPTION

Figure 1:
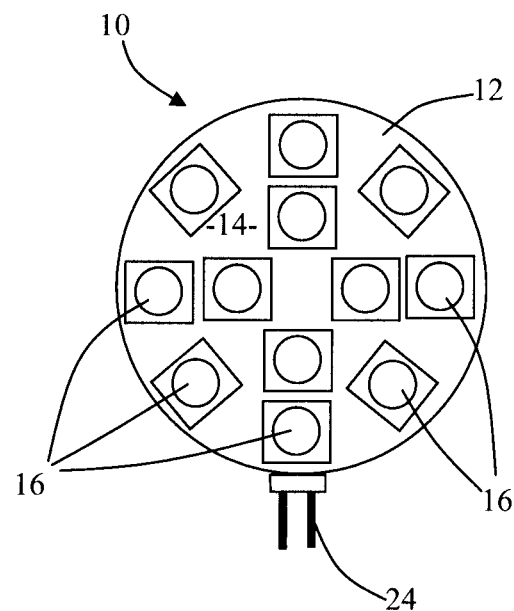
FIG. 1 is a top plan view of a LED bulb according to an embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements. Drawings are not necessarily drawn to scale.

The LED bulb of exemplary embodiments of the present invention may provide low heat generation and may offer low current consumption (low power). It is therefore environmentally friendly and may be considered to generate 'green' energy. It is expected that the lifespan of the LED bulb range up to 40,000 hours when used in appropriate circumstances and is also expected to be easy to install. In come exemplary embodiments, the LED bulb may directly replace a 12V incandescent bulb without requiring any adaptors or any hardware modification. In other words, it may be retrofit into existing traditional light bulb sockets without requiring additional or different hardware. The LED bulb may also have a 5V~16V voltage operation range in some exemplary embodiments, making it appropriate on 12V automotive voltage range. In some exemplary embodiments, the LED bulb is 90% more efficient than xenon bulbs, incandescent bulbs and Halogen bulbs traditional lighting. Unlike the PWM devices of the prior art, the LED bulb of exemplary embodiments do not require complex circuitry or expensive parts, and may have a silent operation (no audible noise). In some exemplary embodiments, the LED bulb is simple and cheap to construct and of robust design. The LED bulb of exemplary embodiments of the present invention can be easily adapted to replace a number of different types of traditional light bulbs, such as G4, MR16, as well as fluorescent tubes.

As used herein, the term "light emitting diode" (LED) is as understood by persons skilled in the art and denotes a semiconductor device that emits visible light when an electric current passes through it.

As used herein, the term "light emitting diode bulb" is a unit, module or device which includes at least one light emitting diode for emitting light and can be connected to a bulb socket by a connector. The connector can be of any type such as a bi-pin, wedge, bayonet, or wire, for example.

The present invention concerns light emitting diode (LED) bulbs, which are arranged to directly replace incandescent and halogen bulbs without the need to modify existing hardware such as the sockets for receiving the bulbs or the on/off/dim switches for controlling the bulbs. Specifically, the embodiments of the present invention described herein are related to LED bulbs whose emitted light intensity or brightness can be varied between at least two levels, typically a bright level and a dimmed level. The specific embodiments described herein are related to retrofittable LED bulbs for replacing G4 light bulbs connectable to three position switches (OFF/ON (bright)/DIM (dim)) for use in Recreational Vehicles (RVs) and other applications. However, it will be apparent to skilled persons that the LED bulbs of the present invention can also be fitted to multi position dimmer switches (OFF/Multiple DIM position/ON), e.g., a slider or rotating switch), or any other type of variable switch.

Figure 2:
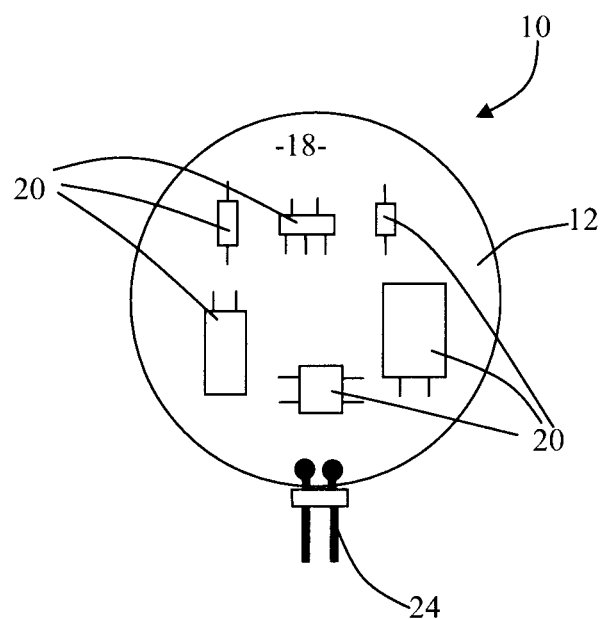
FIG. 2 is a bottom plan view of the LED bulb of FIG. 1.

A first exemplary embodiment of a LED bulb 10 of the present invention is illustrated in FIGS. 1 and 2. The LED bulb 10 comprises a backing plate 12 having a first side 14 including LEDs 16 arranged thereon as an array 17 (shown in FIGS. 3, 4 and 5), and a second side 18 having electronic components 20 arranged thereon, which are connected to the LEDs 16 by an electronic circuit 22 (shown in FIGS. 3, 4 and 5). A connector 24 extends from the backing plate 12 for connection to a power source (not shown) and is connected to the electronic circuit 22 for providing power to the LEDs to illuminate them.

The backing plate 12 is a circular double-sided printed circuit board (PCB) having a diameter of about 30 mm and a thickness of about 0.78 mm, excluding the thickness of the LEDs 16 and the electronic components 20. The connector 24 comprises a pair of straightened pins, 10 mm in length, extending from an edge of the backing plate 12 and preferably made of a tin-plated metal, or the like. Therefore, the bulb 10 can be fitted into any socket suitable for receiving a G4 bulb. The connector 24 may extend from the first or second sides 14, 18 of the backing plate such as perpendicularly from the centre of one of the sides 14, 18 of the backing plate 12. The connector 24 may also be a wedge, a bayonet, a wire, or any other type of connector instead of pins. The size and shape of the backing plate 12 and the connector 24 of the present embodiment is particularly suited to replace halogen and incandescent G4 bulbs for typical application as ceiling lights or under-cupboard lights. However, it will be clear that the present invention can also replace other types of bulbs by altering the size, shape and type of the backing board and the connector used.

The LED array 17 on the backing plate first side 14 comprises 12 LEDs. Each LED 16 is preferably a 3.0 to 3.2V 5050 SMD with a beam angle of 120 deg and a total power of 2.0-2.2 W. The LEDs 16 may all be the same colour, or different colours, such as warm white (2800-3000K), cold white (6000-6500K), amber, blue, red, or green. Preferably, the colour of the LEDs does not change with luminous intensity in any of the embodiments of the present invention. It will be appreciated that any other type of LED can be used instead of 5050 SMD LEDs and more or less than 12 LEDs can also be used.

Figure 3:
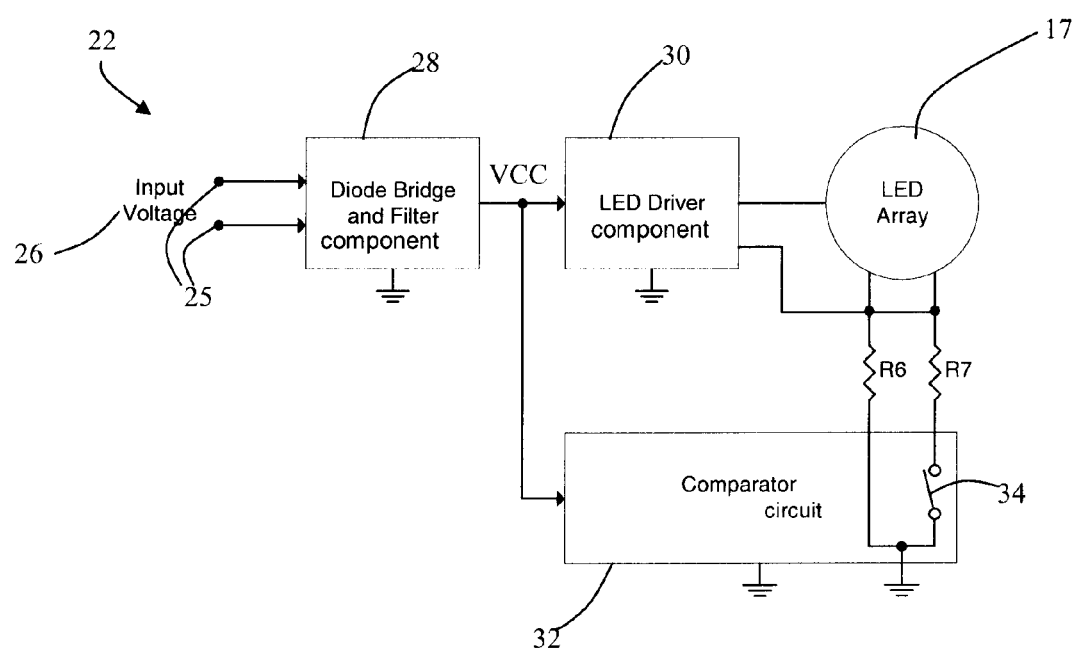
FIG. 3 is a block diagram of the LED bulb of FIG. 1 according to an embodiment of the invention.

FIG. 3 is a block diagram illustrating the electronic circuit 22 of the present invention, which allows the LED bulb 10 to function with at least two light intensities: "Bright" or "Dim". In this exemplary embodiment, the electronic circuit 22 is connectable to a power source through a conventional G4 bulb socket which is connected to a three position switch: OFF (0V), ON (or bright) (12V), and DIM (6V). The electronic circuit 22 comprises input terminals 25 for receiving an input voltage 26; a diode bridge and filter(s) component 28 (which can be optional); a LED driver component 30; the LED array 17; and a comparator circuit 32 including a switch 34. The input voltage ranges from 5V to 16V (DC) or 5V to 12V (AC). The input voltage 26 goes through the diode bridge and filter component 28, which allows the input voltage 26 to be applied in any polarity and converts an AC input voltage to a DC voltage, and outputs a filtered voltage VCC, which goes to the LED driver component 30 and the comparator circuit 32. The LED driver component 30 adjusts the filtered voltage VCC (boosts or reduces) and provides a constant current to the LED array 17. The LED array 17 can be any number or arrangement of LEDs 16 connected in series or in parallel, in this embodiment 12 LEDs. The comparator circuit 32 reads the filtered voltage VCC and identifies if it is higher than a fixed (pre-set) voltage reference. If the filtered voltage VCC is higher than the voltage reference (also called threshold voltage), the comparator circuit 32 closes the switch 34 to set the current of the LED driver component 30 to the "Bright" intensity. In the "Bright" intensity, both resistors R6 and R7 are enabled (connected in parallel). If the filtered voltage VCC is lower than the voltage reference the switch 34 is open and the current of the LED driver component 30 is set to the "Dim" intensity. In the "Dim" intensity, only resistor R6 is enabled, and the LED bulb intensity is lower (about 20% of the bright intensity) than the "Bright" intensity. If the filtered voltage VCC is below the working voltage of the LED driver component 30, the circuit 22 will not function and the LED bulb intensity will be OFF.

In a first exemplary embodiment of the electrical circuit 22 (shown in FIG. 4), the LEDs 16 (D1 to D12) are arranged as a 2×6 array, i.e., two parallel rows of six LEDs 16 connected in a series. Other LED arrangements could be possible, such as 2×5 array, 3×5, etc. The diode bridge and filter component 28 includes a diode bridge D16 for full wave rectification of an incoming AC voltage and for allowing connection without polarity for an incoming DC voltage. Two capacitors C2 (e.g., 1 µF/25V) and C4 (e.g., 22 µF/25V) are provided for filtering the rectified voltage. A varistor RV1 is also included to protect the circuit against overvoltage and voltage spikes.

The filtered input voltage VCC is connected to the LED driver component 30, which comprises a LED driver U1. The LED driver U1 is a boost converter that runs at 600 kHz fixed switching frequency. The exemplary LED driver has pins numbered 1 (FB), 2 (COMP), 3 (GND), 4 (SW), 5 (CTRL) 6 (VIN) and 7 (ThPad). A capacitor C3 (e.g. 0.22 µF) is connected between pin number 2 (COMP) and ground. With the help of an inductor L1, a schottky diode D15 and a capacitor C1 (e.g., 1 µF/25V), the LED driver U1, converts the filtered input voltage VCC to a higher output voltage, VLED. The higher output voltage VLED is about 18V to provide the current needed to each row of the LEDs 16 in the LED array 17. It will be appreciated that depending on the number and arrangement of LEDs in the LED array 17, a different LED driver can be used to either increase or to reduce the input voltage to provide the current needed to power the LEDs.

The current that flows through the LED array 17 is fixed by the two resistors, R6 and R7. Persons skilled in the art will appreciate that changing the value of either or both of the resistors R6 and R7 allows adjustment of one or both of the two light intensities. In this exemplary embodiment, the switch 34 in the comparator and switch circuit 32 includes a MOSFET Q1 (e.g., IRLML2803), or any other suitable switch. When the MOSFET Q1 is closed, the current is at maximum value (approximately 95 mA) and the output light generated by the LEDs (D1 to D12) is at the "Bright" intensity. When the MOSFET Q1 is open, the current is at minimum value (approximately 20 mA) and the light emitted by the LEDs (D1 to D12) is at the Dim intensity level.

Figure 4:
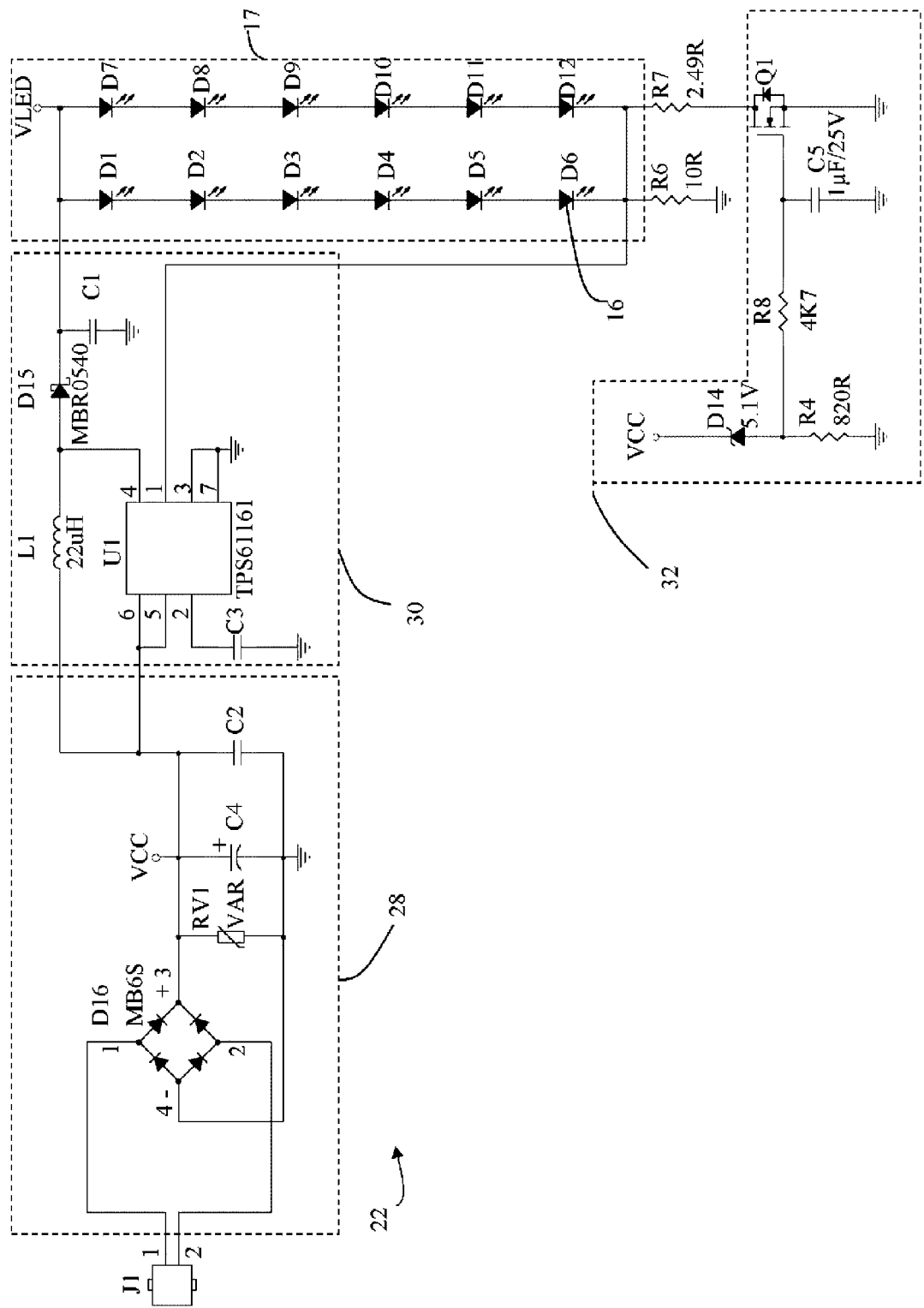
FIG. 4 is a schematic circuit diagram of the LED bulb of FIG. 1 according to a first embodiment of the invention.

In the exemplary embodiment of the electrical circuit 22 illustrated in FIG. 4, the MOSFET Q1 is controlled by a Zener diode D14 and a resistor R4. In this exemplary embodiment, the voltage of the Zener diode is 5.1V although it is possible to use Zener diodes with different working voltages. When the input voltage is equal to or over about 9.5V, enough current flows through D14 and R4 to create a voltage across R4 which then polarizes the MOSFET Q1. In this condition, the MOSFET Q1 is closed and the resistor R7 is activated in the feedback loop of the LED Driver U1. Then the output current is at a maximum value of about 95 mA ("Bright" intensity). When the input voltage is under about 8.5V, not enough current flows through D14 and R4 to polarize the MOSFET Q1. In this condition, the MOSFET Q1 is open and the resistor R7 is not activated. Then the output current is at the minimum value of about 20 mA ("Dim" intensity). If the input voltage is between about 8.5V to about 9.5V (threshold voltage zone), the MOSFET Q1 is partly open. Between about 8.5V to about 9.5V, the MOSFET Q1 functions as a variable resistor and the LED current is between the maximum value of 95 mA ("Bright" intensity) and the minimum value of 20 mA ("Dim" intensity). For example, if the input voltage is 9.0V, then the LED current will be about 58 mA (20 mA+(50%×(95 mA−20 mA)). The threshold voltage zone is a linear region between Dim and Bright intensity. Said differently, in the threshold voltage zone, the LED bulb emitted light intensity will be at a third light intensity level between the "Dim" and the "Bright" intensity levels that is determined linearly relative to the input voltage compared to the lower threshold voltage (e.g., 8.5V) and the higher threshold voltage (e.g., 9.5V). When the electronic circuit 22 is controlled by a three position switch, the threshold voltage zone is not visible because the voltage is a discrete value (OFF (0V), ON (or Bright) (12V), and Dim (6V). With a variable dimmer switch (e.g. a slider switch), the threshold voltage zone can be used to set the LED current between the Dim and Bright intensity, e.g., the emitted light intensity will be at a third level of intensity between "Bright" and "Dim" within the threshold voltage zone. There will be no emitted light from the LED array below about 2.7V at VCC (about 4V input voltage) due to the working voltage of the LED Driver U1. Alternative LED drivers could be used to lower or raise the working voltage of the circuit 22.

It will be appreciated that the threshold voltage is a function of the voltage of the Zener diode used. Therefore, the value of the threshold voltage can be pre-set or pre-determined by using a different Zener diode with a different working voltage.

Figure 5:
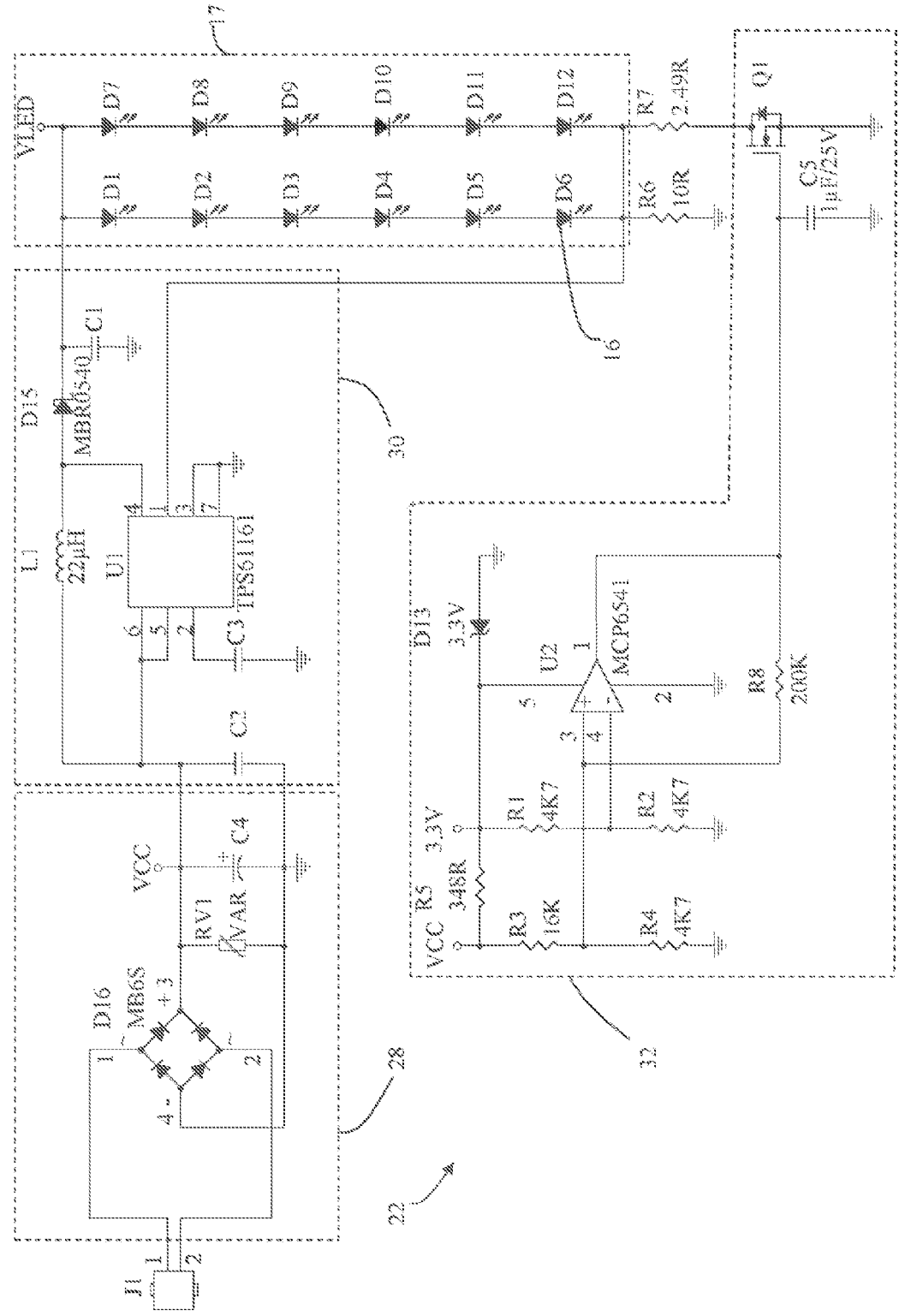
FIG. 5 is a schematic circuit diagram of the LED bulb of FIG. 1 according to a second embodiment of the invention.

A second exemplary embodiment of the electrical circuit 22 is illustrated in FIG. 5, and differs from the exemplary embodiment of FIG. 4 in that the MOSFET Q1 is controlled by a comparator IC (Integrated Circuit) U2. A resistor R5 and a Zener diode D13 provide a stable and regulated 3.3V to power the comparator IC U2, but are optional as the comparator IC U2 can be powered directly on the VCC or by a voltage regulator. Resistors R1 and R2 create a reference voltage (approximately 1.65V) to an inverting (−) input of the comparator IC U2. Resistors R3 and R4 do a voltage divider (0.22×VCC) from the filtered input voltage VCC. The divided voltage is connected to a non-inverting (+) input of the comparator IC U2. When the input voltage is over about 8.75V the voltage of the non-inverting (+) input of the comparator IC U2 is higher than the reference voltage (1.65V) of the inverting (−) input and the output of the comparator IC U2 is at high level (3.3V) and then polarizes the MOSFET Q1. In this condition, the MOSFET Q1 is closed and the resistor R7 is activated in the feedback loop of the LED Driver U1. Then the output current is at maximum value of 95 mA ("Bright" intensity). When the input voltage is below about 8.75V, the voltage of the non-inverting (+) input of the comparator IC U2 is under the reference voltage (1.65V) of the inverting (−) input and the output of the comparator IC U2 is at low level (0V) and does not polarize the MOSFET Q1. In this condition, the MOSFET Q1 is open and the resistor R7 is not activated. Then the output current is at minimum value of 20 mA ("Dim" level). In this exemplary embodiment, there is no threshold voltage zone, but a fixed threshold voltage of about 8.75V. It will be appreciated that, in this exemplary embodiment, the threshold voltage is a function of the resistance of resistors R1 and R2. Therefore, the value of the threshold voltage can be pre-set or pre-determined by using resistors with different resistance values.

The LED Driver IC is TPS61161. Alternatively, any another LED Driver IC with an analog input pin can be used to control the output current instead of controlling the resistor R7 in the feedback loop of the LED Driver. In other words, instead of connecting the switch to a resistor connected to the LED array, the switch and the resistor can be connected to an analog input pin of the LED driver to perform the LED intensity control. In this way, the connection of the MOSFET Q1 could be used to control a voltage level to an analog input pin of the LED Driver to change the output current of the LED Driver.

Although the exemplary embodiments of the invention have been described in relation to replacement incandescent and halogen G4 bulbs, it will be appreciated that other applications are within the scope of the present invention such as Cantalupi (trademark) Lights, Cabin (trademark) Lights and Imtra (trademark) Lights. It will also be appreciated that the embodiments of the LED bulb 10 described herein can be modified, without departing from the scope of the invention, for different uses and applications such as by changing the shape and size of the backing plate, or by changing the position or type of the connector, or by changing the type, number or arrangement of the LEDs, or by changing the electronic components and IC.

It is important to note that the figures illustrate specific exemplary embodiments of the present invention, and are not intended to limit the scope of the present disclosure or claims to that which is presented therein. For example, a switching device such as a MOSFET is illustrated but other switching devices such as relay, bipolar transistors, electronic analog switch IC, etc. could be used. Also, a specific LED Driver U1 (TPS61161) is illustrated but any other LED Driver IC could be used. The LED bulb could comprise a single LED rather than an array. The emitted light intensities of the light bulb 10 need not be bright and dim but could be any light intensity. The diode bridge and filter component 28 may be omitted from the circuit 22, particularly for DC applications. The diode bridge and filter component 28 may comprise a diode only without the filter components or vice versa. Alternatively, the diode bridge and filter component 28 may be replaced by a filter for filtering the input voltage 26.

While several embodiments of the invention have been described herein, it will be understood that the present invention is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention as defined in the appended claims.

The invention claimed is:

1. A LED bulb comprising: a support having at least one LED mounted on a first side, the at least one LED being electrically coupled to a circuit mounted on a second side of the support for driving the LED bulb at a first or a second light intensity level, the circuit comprising:
   input terminals connectable to a power supply for receiving an input voltage; a LED driver component for adjusting the input voltage supplied to the at least one LED;
   a comparator circuit for detecting the input voltage and if above a threshold voltage closing a switch to drive the LED bulb at the first light intensity level;
   wherein the comparator circuit includes a Zener diode connected in series with a resistor and the switch.

2. A LED bulb according to claim 1, wherein the switch is connected to a resistor which is activated when the switch is closed.

3. A LED bulb according to claim 2, wherein the first light intensity is a bright intensity level and the second light intensity is a dim intensity level.

4. A LED bulb according to claim 3, wherein the input voltage is between 5V and 16V.

5. A LED bulb according to claim 1, wherein the switch is a MOSFET.

6. A LED bulb according to claim 1, wherein the input terminals are a pair of pins.

7. A LED bulb according to claim 1, wherein the support is a printed circuit board.

8. A LED bulb according to claim 1, further comprising at least one diode for making the light bulb non-polarized.

9. A LED bulb according to claim 8, further comprising at least one capacitor for filtering the input voltage.

10. A LED bulb according to claim 1, wherein the LED bulb is sized and shaped to fit into a socket suitable for receiving a G4-type bulb.

11. A LED bulb according to claim 1, wherein the at least one LED is an array of LEDs.

12. A LED bulb according to claim 11, wherein the array of LEDs comprises two parallel rows of six LEDs, the six LEDs being connected in a series.

13. A LED bulb according to claim 1, wherein the switch is a MOSFET.

14. A LED bulb according to claim 1, wherein the threshold voltage for the first light intensity level is about 9.5V.

15. A LED bulb according to claim 14, wherein the switch is open and drives the LED bulb at the second light intensity level if the input voltage is below a second threshold voltage of about 8.5V.

16. A LED bulb according to claim 15, wherein the switch is a MOSFET that functions as a variable resistor and drives the LED bulb at a third light intensity level if the input voltage is between the second threshold voltage and the threshold voltage.

17. A LED bulb according to claim 16, wherein the third light intensity level varies linearly between the second light intensity level and the first light intensity level relative to the input voltage compared to the threshold voltage and the second threshold voltage.

18. A LED bulb according to claim 1, wherein the comparator circuit includes a comparator integrated circuit, and at least one reference resistor to create a reference voltage, wherein the comparator integrated circuit compares the input voltage to the reference voltage and closes the switch when the input voltage is above the threshold voltage.

19. A LED bulb according to claim 18, wherein the threshold voltage for the first light intensity level is about 8.75V.

\* \* \* \* \*